(12) United States Patent
Banerjee et al.

(10) Patent No.: US 7,333,774 B2
(45) Date of Patent: Feb. 19, 2008

(54) METHOD OF OPTIMIZING WIRELESS COMMUNICATION LINKS USING STORED CHANNEL CHARACTERISTICS OF DIFFERENT LOCATIONS

(75) Inventors: Debarag N. Banerjee, Sunnyvale, CA (US); Arogyaswami J. Paulraj, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 58 days.

(21) Appl. No.: 10/962,201

(22) Filed: Oct. 7, 2004

(65) Prior Publication Data

US 2005/0136943 A1    Jun. 23, 2005

Related U.S. Application Data

(60) Provisional application No. 60/509,513, filed on Oct. 7, 2003.

(51) Int. Cl.
*H04B 17/00* (2006.01)
*H04Q 7/20* (2006.01)

(52) U.S. Cl. .................. 455/67.11; 455/456.1
(58) Field of Classification Search ................ 455/506, 455/456.1
See application file for complete search history.

(56) References Cited

U.S. PATENT DOCUMENTS

| | | | | |
|---|---|---|---|---|
| 6,108,565 A * | 8/2000 | Scherzer | ................... | 455/562.1 |
| 6,249,680 B1 * | 6/2001 | Wax et al. | ................ | 455/456.2 |
| 6,487,417 B1 * | 11/2002 | Rossoni et al. | .......... | 455/67.16 |
| 6,697,644 B2 * | 2/2004 | Scherzer et al. | ......... | 455/562.1 |
| 6,963,619 B1 * | 11/2005 | Gesbert et al. | ............. | 375/267 |
| 6,985,466 B1 * | 1/2006 | Yun et al. | ................... | 370/335 |
| 7,027,421 B2 * | 4/2006 | Park et al. | .................. | 370/335 |
| 7,117,014 B1 * | 10/2006 | Van Rensburg et al. | .... | 455/561 |
| 2001/0003443 A1 * | 6/2001 | Velazquez et al. | .......... | 342/367 |
| 2002/0147032 A1 | 10/2002 | Yoon et al. | ................. | 455/562 |

OTHER PUBLICATIONS

Caffery et al., "Overview of Radiolocation in CDMA Cellular Systems," IEEE Comm. Mag., vol. 36, No. 4, Apr. 1998, p. 38.

(Continued)

*Primary Examiner*—Joseph Feild
*Assistant Examiner*—Michael Faragalla
(74) *Attorney, Agent, or Firm*—Lumen Intellectual Property Services, Inc.

(57) ABSTRACT

Techniques for location-assisted wireless communication use real-time location(s) of wireless transceiver(s) together with stored location-indexed channel information to improve communication over a wireless channel between the transceiver(s). The stored channel information includes channel characteristics (e.g., average power, angle-of-arrival, and time delay of multipath components) that are substantially constant in time but vary gradually as a function of location. Current transceiver location(s) are obtained and used to retrieve stored channel characteristics corresponding to the location(s). The channel information may be used at either or both transceiver(s) to improve reception and/or transmission of signals propagating over the wireless channel. For example, reception may be improved by using path angle information to perform spatially structured reception, or using path delay information to perform temporally structured reception, e.g., to assign fingers to multipath components in a RAKE receiver and/or to track time delays of multipath components.

8 Claims, 5 Drawing Sheets

OTHER PUBLICATIONS

Pahlavan et al., "Wideband Radio Propagation Modeling for Indoor Geolocation Applications," IEEE Comm. Mag., vol. 36, No. 4, Apr. 1998, p. 60.

Reed et al., "An Overview of the Challenges and Progress in Meeting the E-911 Requirement for Location Service," IEEE Comm. Mag., vol. 36, No. 4, Apr. 1998, p. 30.

Tekinay, "Wireless Geolocation Systems and Services," IEEE Comm. Mag., vol. 36, No. 4, Apr. 1998, p. 28.

Tekinay et al., "Performance Benchmarking for Wireless Location Systems," IEEE Comm. Mag., Apr. 1998, p. 72.

K. Pahlavan, M. Kanaan, "A Comparison of Wireless Geolocation Algorithms in the Indoor Environment", IEEE Wireless Communications and Networking Conference, vol. 1, pp. 21-24, 2004.

M. Poretta, P. Nepa, G. Manara, F. Giannetti, M. Dohler, B. Allen, A. Aghvami, "A novel single base station location technique for microcellular wireless networks: description and validation by a deterministic propagation model", IEEE Trans. Vehicular Technology, vol. 53, No. 5, pp. 1502-1514, 2004.

* cited by examiner

METHOD OF OPTIMIZING WIRELESS COMMUNICATION LINKS USING STORED CHANNEL CHARACTERISTICS OF DIFFERENT LOCATIONS

CROSS-REFERENCE TO RELATED APPLICATIONS

This application claims priority from U.S. provisional patent application No. 60/509,513 filed 7 Oct. 2003, which is incorporated herein by reference.

FIELD OF THE INVENTION

The present invention relates generally to wireless communication systems, devices, and methods. More specifically, it relates to techniques for determining and/or using wireless channel characteristics to improve the capacity and/or performance of wireless communication systems such as cellular systems.

BACKGROUND OF THE INVENTION

A wireless communication system such as the cellular system illustrated in FIG. 1 typically includes a collection of base stations 100, 102, 104 positioned at known locations in their respective service areas 106, 108, 110 and connected to a common radio access network hub 118. These base stations provide wireless communication services to a set of mobile transceivers such as cellular telephone handsets 112, 114, 116 which may wander throughout service areas 106, 108, 110. Typically, at any given time, a mobile transceiver is served by one or more of the base stations. Wireless signals, such as signal 120, propagating through the environment between a mobile and a base station experience various types of environmental distortions due to noise, interference, attenuation, reflection, refraction, and diffraction. In particular, reflections from scattering objects in the environment results in multipath effects, i.e., the splitting of the original signal into multiple signals following different paths and, consequently, arriving at the receiver with distinct delays, phases, angles-of-arrival and amplitudes. The overall effect of multipath and other signal distortions is described in terms of channel characteristics. FIG. 2 illustrates schematically how a signal $s_k$ transmitted from a transmitter 200 as transmitted signal $x_k$ is distorted as it propagates through channel 202 characterized by a channel impulse response h. The distorted signal, plus noise $n_k$, is received at a receiver 204 as received signal $y_k$. The task of the receiver is to recover original signal $s_k$ from the received signal $y_k$. Normally, however, the noise $n_k$ and channel impulse response h are not known a priori, resulting in the problem at the receiver of recovering the original signal. Thus, a well-known challenge of wireless communication systems is to estimate the channel characteristics, and thereby improve the ability of the receiver to accurately recover the original signal.

Known techniques for channel estimation include the use of training symbols and/or blind/joint estimation techniques. In a mobile communications system, however, channel characteristics vary due to changes in the environment and changes in the location of the mobile transceiver. These changes in the channel characteristics make it difficult to obtain up-to-date and accurate estimates of the current channel characteristics, thereby limiting the performance and capacity of the communication system. There is a need, therefore, for improved techniques for channel estimation in wireless communication systems.

SUMMARY OF THE INVENTION

A fundamental insight behind the present invention is that certain channel characteristics (such as multipath power, angle, and delay) are substantially constant in time but vary gradually as a function of location. In addition, mobile transceiver's location can be determined using one or more wireless transceiver location-finding techniques. Thus, the dependence of the channel characteristics upon location can be used together with transceiver location information to improve channel estimation, and hence to improve wireless communication performance between transceivers.

The specific channel characteristics of interest may be measured off-line and stored in the form of channel information indexed by the transceiver locations. For example, specific embodiments of the invention, the location-dependent channel information may include delay information, delay-angle information, power-delay information, power-delay-direction (angle of arrival) information and/or cross-polarization information of one or more propagation paths between the transceivers. The location information of the transceiver(s) may be determined using any geolocation technique including but not limited to use of the global positioning system (GPS). Each location, or pair of locations, and the associated channel information may be measured off-line in a calibration procedure and stored for later retrieval. During real-time operation, the current location(s) of the transceiver(s) may be determined and this location information then may be used to retrieve associated channel information. The channel information then may be used to increase performance in transmission and/or reception in uplink and/or in downlink, thereby increasing system capacity.

Thus, according to one aspect of the invention, a method is provided for location-assisted wireless communications. The method includes storing channel information indexed by location, where the channel information contains empirically determined propagation characteristics of wireless channels between two transceivers at known locations. These propagation characteristics may include channel characteristics associated with major signal paths between the two transceivers such as, for example, time delay information, average power information, and angle of arrival information. The two transceivers may be a base station and mobile transceiver, or two mobile transceivers. Thus, the channel information may contain information indexed by various locations of mobiles in a service area of a base station, or by various location pairs of mobile transceiver pairs. The method also includes obtaining a current location of a first wireless transceiver. In some cases the method may also include obtaining the current location of the second wireless transceiver, such as in a peer-to-peer communication system. The current location information may be obtained, for example, using a location determination technique such as GPS, DGPS, or any other location determination technique such as those satisfying an E911 mandate for cellular systems. As needed, the current location information may be transmitted from one wireless transceiver to another. In some cases, however, no transmission is required. The method also includes retrieving from the stored channel information the current channel information associated with the current location(s) of one or both of the wireless transceivers. The retrieved current channel information comprises propagation characteristics of a wireless channel between the first wireless transceiver and the second wireless transceiver. As needed, the current channel information may be transmitted to either or both of the wireless transceivers, although in some cases this is not necessary. The method then uses the retrieved current channel information to improve wireless communication performance between the first wireless transceiver and a second wireless transceiver. Performance may be improved by using the current channel information to improve reception and/or transmission of signals propagating over the wireless channel. For example, reception may be improved by using path angle information to perform spatially structured reception, or using path delay information to perform temporally structured reception, e.g., to assign fingers to multipath components in a RAKE receiver and/or to track time delays of multipath components. Transmission may be improved, for example, by using path angle information to perform spatially structured transmission (e.g., spatial beamforming with a space-time transmitter) and/or using path delay information to perform temporally structured transmission (e.g., pre-RAKE, pre-equalization).

DETAILED DESCRIPTION

Figure 1:
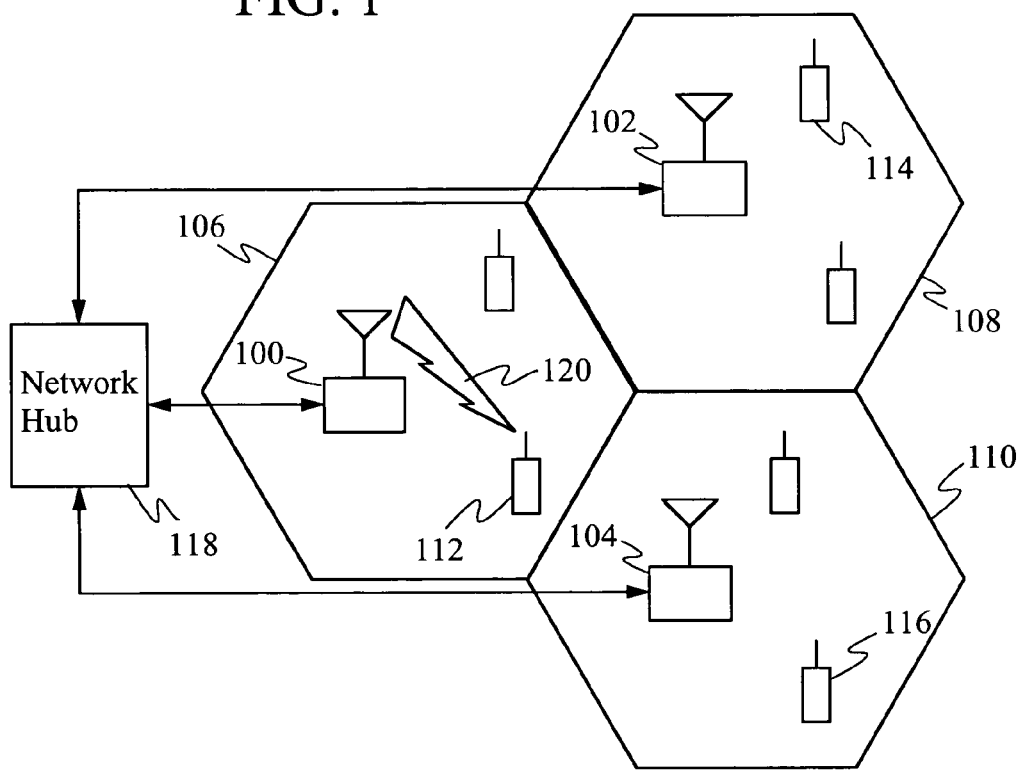
FIG. 1 is a schematic diagram of a cellular communication system having a set of base stations providing wireless communication services to mobile transceivers in their service areas.
Figure 2:
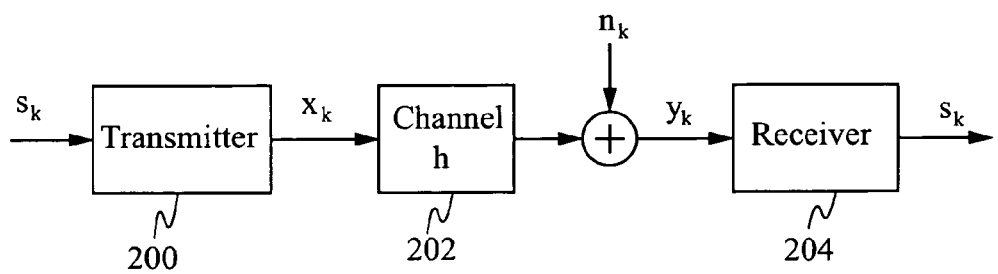
FIG. 2 is a schematic illustration of how a signal $s_k$ transmitted as signal $x_k$ is distorted by a channel impulse response h. as it passes through a wireless channel.
Figure 3:
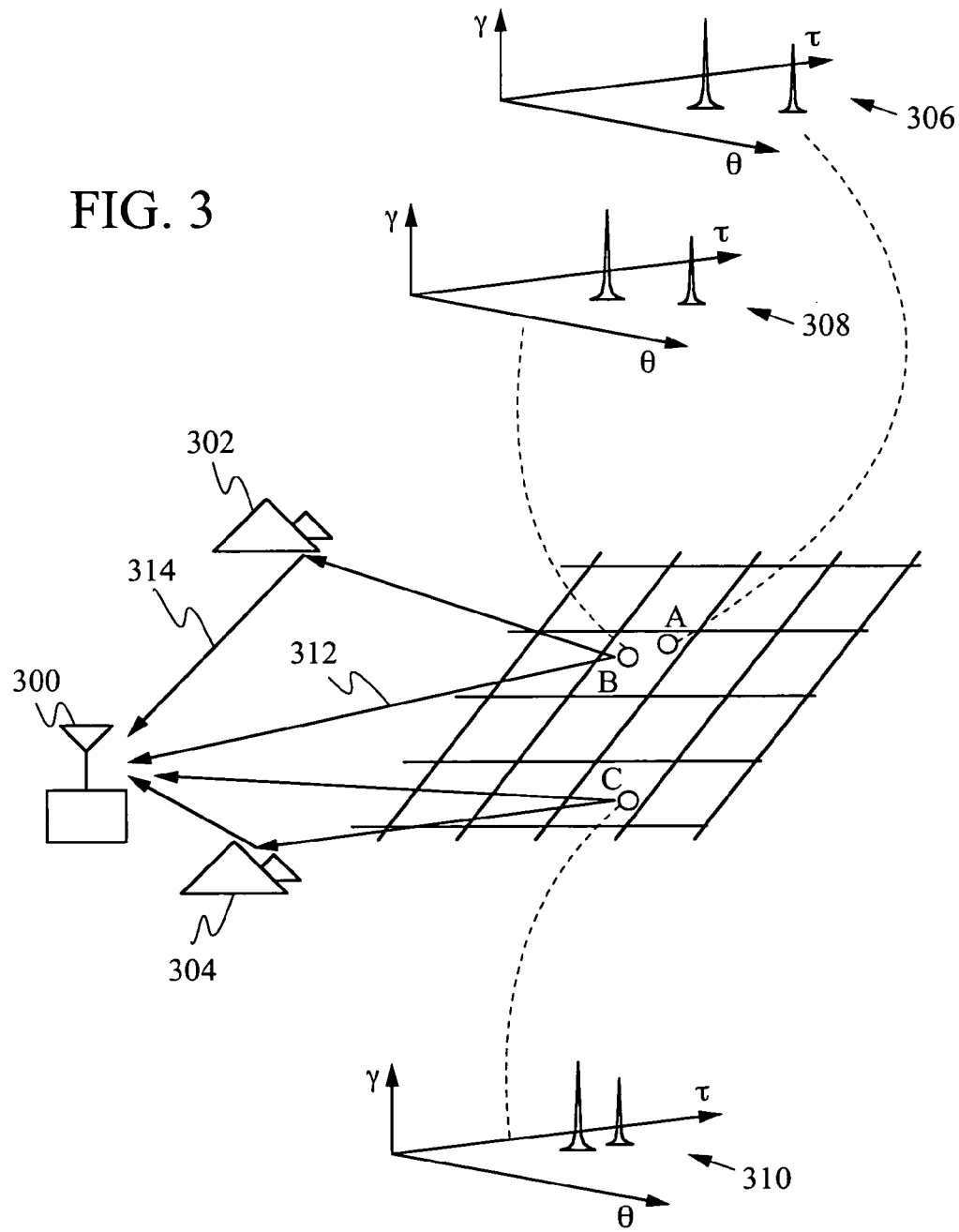
FIG. 3 illustrates the wireless channels and corresponding channel information associated with different mobile locations in a base station service area.

Wireless channel characteristics in general have dependence on time, space, and frequency. Different channel characteristics change in different ways, however. For example, transceiver movement over short distances (say, less than 10 meters) causes significant changes in the phase of signals propagating along different paths. At the same time, however, the times of arrival of signals along the different paths, as well as the average power levels and angles of arrival remain relatively invariant to such displacements. Although these channel characteristics are relatively invariant with respect to small changes in location, they do vary with transceiver movement over larger distances. In addition, these characteristics are also relatively stable in time. These particular channel characteristics are thus stable functions of location, and provide an example of channel information that is suitable for location-based indexing. FIG. 3 illustrates these ideas graphically. As shown in the figure, the wireless channel between a base station 300 and a mobile transceiver at location B has two paths: a primary path 312 and a secondary path 314 which is reflected from a scattering object 302. This wireless channel has associated channel information 308. If the mobile transceiver moves a small distance to nearby location A, the associated channel information 306 does not change significantly. However, if the mobile transceiver moves a larger distance to location C, then the associated channel information 310 is substantially different since the wireless channel from location C to base station 300 is scattered from a different scattering object 304. Thus, associated with each location are unique channel characteristics and this channel information varies with substantial changes in location.

Accordingly, in the context of this document, the term "channel information" is used to refer to channel propagation characteristics that are 1) substantially constant in time (i.e., do not vary significantly over weeks or months) 2) substantially constant over small spatial displacements (i.e., smaller than 10 meters) but 3) vary as a function of larger spatial displacements. More generally, "channel information" means any information characterizing the propagation of wireless signals between two transceivers that is a substantially time-invariant function of the transceiver location(s). Preferably the channel information has a degree of variation with location that does not exceed the spatial accuracy with which the transceiver location may be determined. In other words, the channel information is substantially constant over spatial displacements less than the spatial resolution of the location information.

The nature of the channel information allows it to be empirically measured, correlated with location information, and stored for later use. For example, in a calibration procedure one or more mobile transceivers may roam a service area(s) of one or more base stations. For example, referring again to FIG. 3, a mobile may roam from location A to location B to location C in the service area of base station 300. At each location of the mobile, its location information is determined along with the associated channel information for the wireless channel between the base station and the mobile, resulting in channel information 306, 308, 310 indexed by locations A, B, C, respectively. (In the case of a peer-to-peer network, two mobiles may roam the service area and both their locations are determined along with the associated channel information for each location pair.)

Various conventional techniques can be used to determine the location of a mobile transceiver during calibration, including but not limited to GPS, DGPS, and other location determination methods. It should be noted that some location determination methods obtain the location at the mobile transceiver (e.g., GPS) while others obtain the location at the base station. Mobile-based and network-based location determination techniques may also be combined to form hybrid schemes. The accuracy of the location information is preferably better than the spatial variation of the location-indexed channel information. For example, if the stored channel information is substantially constant at displacements less than 15 meters, then a location determination technique with an accuracy of 15 meters or less would suffice.

Various conventional techniques may be used to determine channel information during calibration, including but not limited to the use of training symbols or other predetermined signal structures, and the use of blind and/or joint estimation techniques. It is significant that, during calibration, sufficient time can be taken to accurately determine each location and the associated channel information with the necessary degree of accuracy. In addition, higher fidelity mobile transceivers may be used to enable better identification of multipaths during calibration. Preferably, to improve the estimation of channel parameters, the calibration is performed under controlled interference circumstances, e.g., when the network is lightly loaded.

Figure 4:
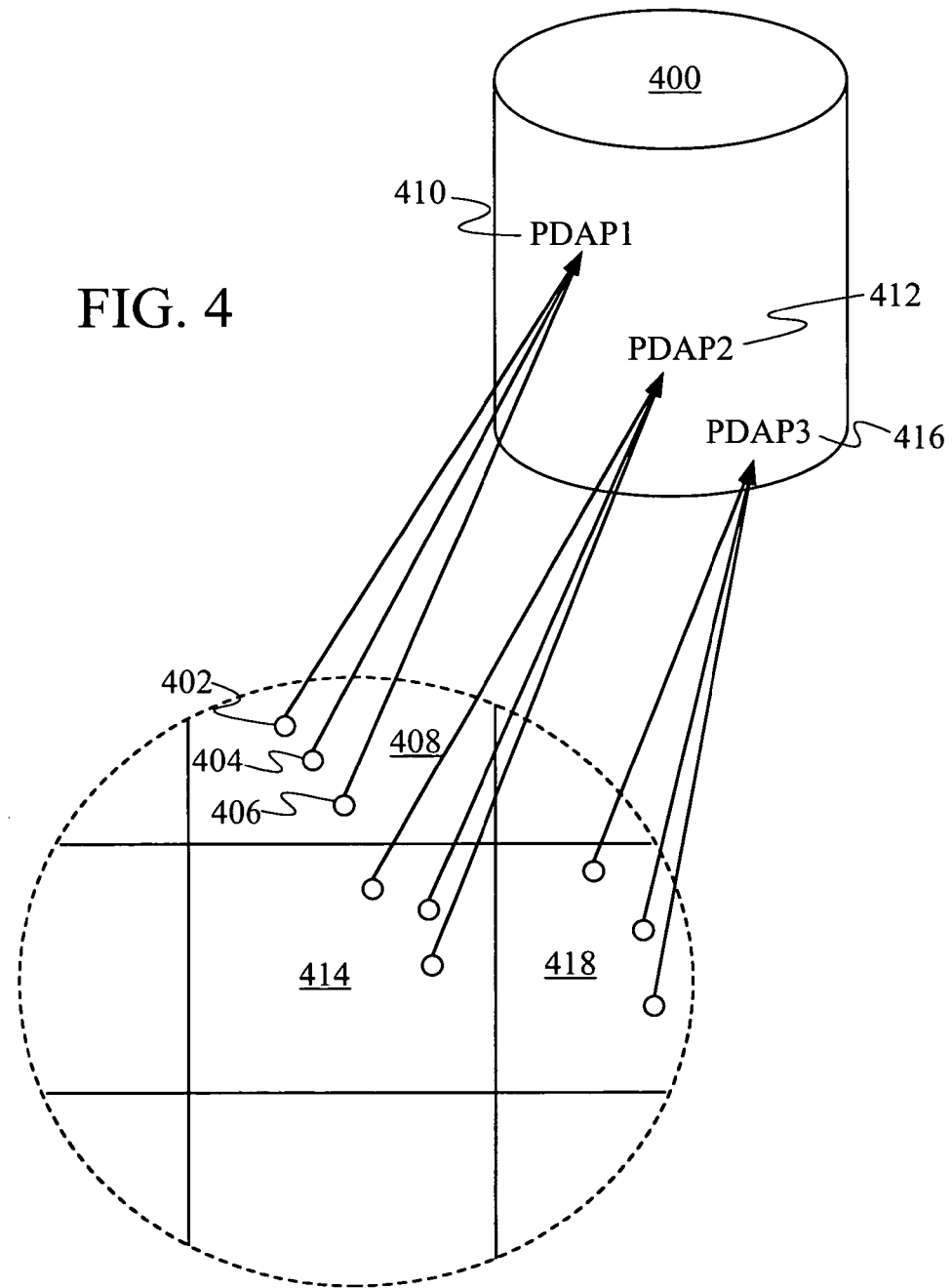
FIG. 4 shows a database channel information indexed by location, where each power-delay-angle profile (PDAP) in the database is associated with a multiple locations in a region in which the channel information is relatively constant.

The location information and channel information collected during calibration can be processed and stored for later retrieval. For example, the location and channel information may be stored as digital data on a conventional digital storage medium 400, as shown in FIG. 4. The data may be organized, for example, as a location-indexed database that is accessible to the base stations, or mobiles, or both. The database, in general, may be located any place in the communication system, and may be distributed in part or in whole in various ways throughout the system to facilitate accessibility. For example, the database may be entirely located at one or more network hubs, or at some other location, provided the channel information may be communicated via a wired or wireless link to the part or parts of the communication system, as needed. In addition, or alternatively, the database may be distributed among the particular base stations, so that each base station stores the channel information associated with the locations it serves. Some database information may even be stored at mobile transceivers, such as channel information associated with a set of customized locations where the mobile is frequently located. Preferably, the channel information is updated, re-calibrated, or verified periodically, e.g., once every three months. In addition, the database may be continuously updated using data from mobiles during real-time use. For example, a weighted average of the stored channel information and real-time estimated channel information can be used to compute and store updated channel information. As mobiles visit a particular location, the updates will improve the accuracy of the stored channel information over time. A related technique during real-time operation is, in the case of a mobile whose location is stationary for a period of time, to give more weight temporarily to the time-averaged estimated channel information than to the stored channel information.

The processing of the calibrated channel information may include various techniques of collation, averaging, and organizing to facilitate efficient storage and fast retrieval. For example, instantaneous location and/or channel information may be time-averaged and space-averaged (over small distances) to improve accuracy. For example, a set of neighboring locations 402, 404, 406 with substantially equal channel characteristics may be grouped together to represent a contiguous region 408 in which the channel characteristics are substantially constant. Thus, for best results, the geographical spacing of samples 402, 404, 406 is preferably smaller than the size of the region 408 of constant channel characteristics. In this case, the channel information 410 for the region 408 may be the result of averaging or otherwise processing the channel information from the various locations 402, 404, 406 in the region. Similarly, channel information 412 may be derived from channel information from various locations in region 414, and channel information 416 from various locations in region 418. The stored channel information 410, 412, 416 is indexed by geographical region 408, 414, 418, respectively, and this type of indexing is considered in the present description to be a particular type of indexing by location. Those skilled in the art will appreciate that many other methods may be used to organize, process, index, and store the location and channel information.

Figure 5:
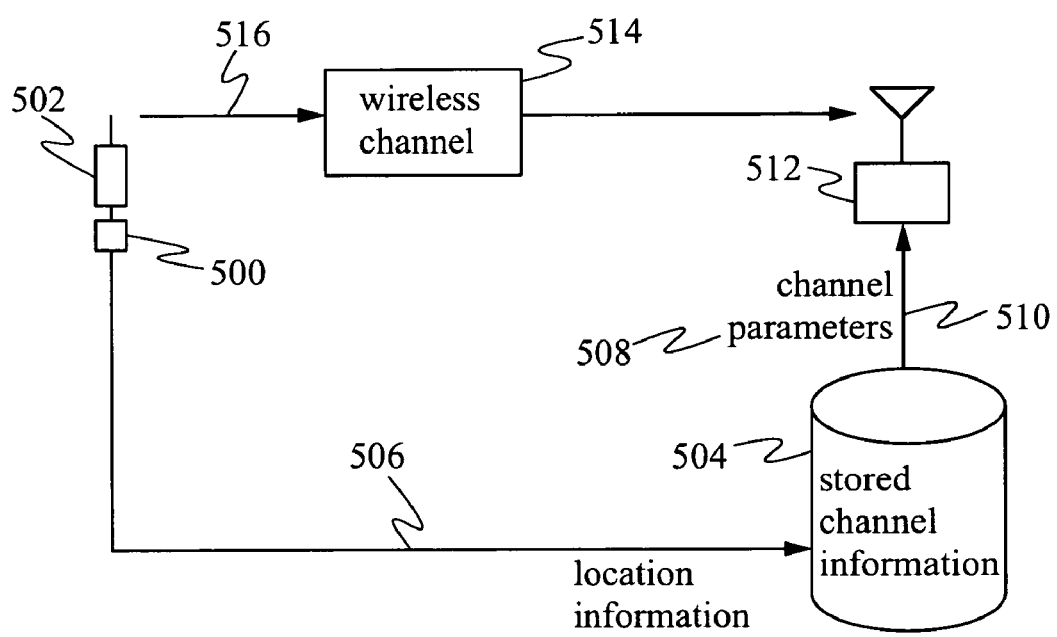
FIG. 5 illustrates a cellular communication system implementing an embodiment of the present invention in which the location of a mobile is determined in real time using a GPS receiver, transmitted to a location-indexed channel information database, and used by a base station to improve reception.

The calibrated channel information may be used during real-time operation of the communication system to improve reception and/or transmission between transceivers. In general, real-time location information of one or more transceivers is obtained and used to retrieve associated channel information that was stored earlier. This current channel information is then used to improve either reception and/or transmission at one or both transceivers. For example, FIG. 5 illustrates a cellular communication system implementing an embodiment of the present invention. In this particular embodiment, the location of the mobile is determined in real time using a GPS receiver 500 integrated with the mobile transceiver 502. After it is obtained from the GPS receiver, this current location information is transmitted to the location-indexed channel information database 504 via a communications link 506. Link 506 may be a wireless link or a combination of wireless and wired links, where the wireless link may be the primary wireless channel between the mobile and base station, or a side-band, sub-band, or other wireless channel. Note that other location-determination techniques may obtain the location information directly at the base station, thus eliminating the need for link 506.

In any case, the current location information is then used to lookup in database 504 the corresponding channel information 508 for the mobile 502. This current channel information is then provided to base station 512 via communications link 510, which is preferably a wired link. Base station 512 then uses the current channel information 508 to improve reception of a wireless signal 516 propagating from mobile transceiver 502 through wireless channel 514 to base station 512. In other embodiments, the current channel information 508 may be used at the base station to improve transmission to the mobile. Still other embodiments include sending the channel information to the mobile (or storing it there) to allow the mobile transceiver to improve reception and/or transmission. The channel information can improve reception because it can be used by the receiver to more quickly and accurately recover the original signal from the received signal which has propagated through the wireless channel. The channel information can also improve transmission because it can be used by the transmitter to appropriately shape the signal in time and/or space to cancel or compensate for the distortions introduced by the wireless channel.

Figure 6:
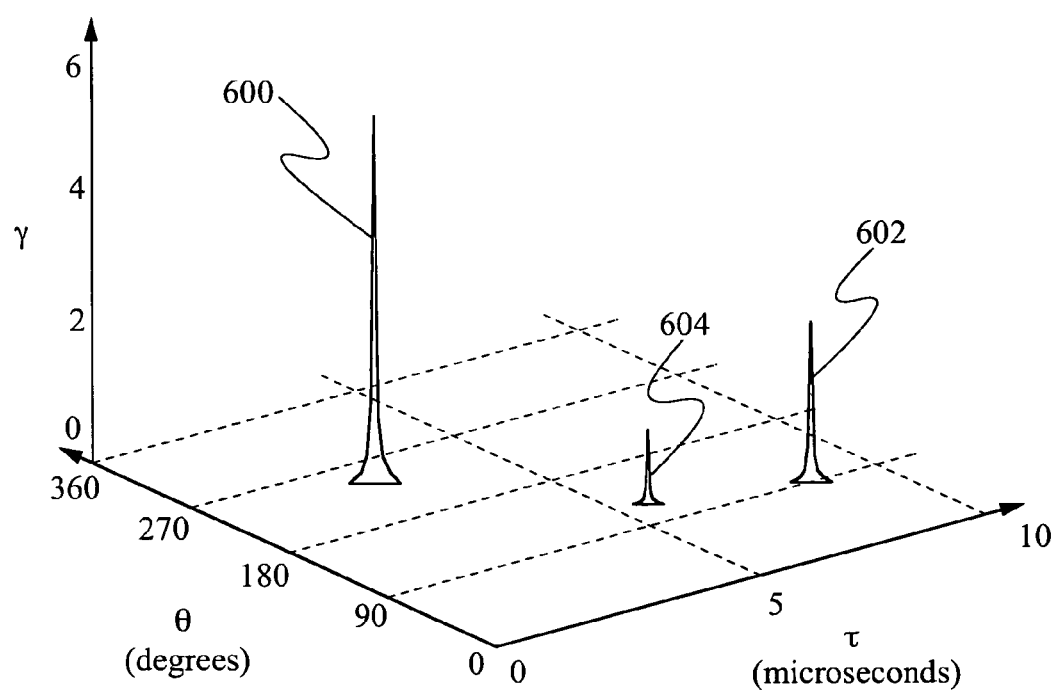
FIG. 6 is a graph of the average power $\gamma$ transmitted through a wireless channel as a function of angle-of-arrival $\theta$ and time delay $\tau$ for three significant multipath components. The power-delay-angle parameters associated with the three paths are used in one embodiment of the invention as stored channel information for the wireless channel.

In one specific embodiment, the performance of a RAKE receiver at a base station of a CDMA-type cellular system is improved using location-indexed channel information. The location-indexed channel information stored in database 504 contains, for each indexed location, a power-delay-angle profile (PDAP) for each channel multipath. For example, a PDAPs associated with a wireless channel is graphically represented in FIG. 6 which shows the intensity of the average power $\gamma$ transmitted through the wireless channel as a function of angle $\theta$ and time delay $\tau$. The three peaks 600, 602, 604 represent three spatial paths of the channel. The primary path 600, which has the shortest delay and the largest amplitude, is a direct line-of-sight path between the transceivers. The secondary paths 602 and 604, which have longer delays and smaller amplitudes, are due to multipath reflections from environmental scattering objects. Thus, the PDAP for each path may be represented as a power-delay-angle $(\gamma,\tau,\theta)$ channel parameter triplet. Thus, the channel information in this case includes three such parameter triplets, $(\gamma_1,\tau_1,\theta_1)$ $(\gamma_2,\tau_2,\theta_2)$, $(\gamma_3,\tau_3,\theta_3)$, one triplet for each of the three spatial paths. More generally, if a channel has L paths, then the channel information for a location includes the L triplets $(\gamma_1,\tau_1,\theta_1), \ldots, (\gamma_L,\tau_L,\theta_L)$. The PDAP is known to be constant over small variations in location and to be stable in time (absent any significant changes in environmental structures). Thus, the PDAP is a gradually varying function of location. It should be noted, however, that other embodiments of the invention may have more channel information, less channel information, or different types of channel information.

A conventional RAKE receiver without location assist must continually estimate the current channel parameters using a channel estimator. The channel estimator provides estimates $(\gamma', \tau', \theta')$ for the various signal paths. These estimates, however, have errors due to noise and finite channel coherence time, and can be outdated by the time they are generated. With location assist, however, given current location information, error-free channel parameters $(\gamma_1, \tau_1, \theta_1), \ldots, (\gamma_L, \tau_L, \theta_L)$ are obtained almost instantly from the PDAP database. This accurate and immediate knowledge of channel information increases receiver performance by replacing or supplementing conventional estimates of channel parameters. In particular, the channel parameters can be used by a RAKE receiver to accurately assign the strongest paths to the fingers with the appropriate delays, reducing path acquisition errors. In addition, the channel parameters can be used by a RAKE receiver to help track the path delays of multipath components. In a space-time RAKE (ST-RAKE) receiver, channel parameters can be used to help angle tracking.

Path acquisition is the process of determining the strongest signal components and assigning them to different fingers of a RAKE receiver. For various reasons, however, conventional path searchers in RAKE receivers do not always select the signal components properly. The result is reduction in receiver performance. A location-assisted RAKE receiver, on the other hand, will always select the best signal components. Because the mobile transmit power is controlled by the base station in a CDMA system, the base station can deduce the expected strengths of the signal components from the channel parameters obtained from the PDAP database. The base station can then use this signal strength information to assist in the proper acquisition of signal components.

In conventional RAKE receivers, signal component delays are estimated and tracked using a set of delay trackers. Due to noise and finite observations, the delay estimates often have significant errors, resulting in a reduction in receiver performance. A location-assisted RAKE receiver, on the other hand, has accurate delay values provided by the PDAP database.

Conventional ST-RAKE receivers perform angle tracking, i.e., tracking of the complex array response vector representing the response of the receiver's antenna array to signal components arriving at different angles. For various reasons, accurate angle tracking is difficult to perform. A location-assisted ST-RAKE receiver, however, will have improved performance since the channel information is provided from the database. In this case, the database may be supplemented by additional channel parameters such as the normalized array response vectors corresponding to the paths of the channels from each mobile location. The array response can be used to reduce the multi-dimensional channel estimation problem to a one-dimensional problem. To help identify the paths during calibration, the calibrating mobile preferably has a high fidelity transmitter and uses a reference signal whose bandwidth is at least as large as the cellular system bandwidth. A location-assisted ST-RAKE receiver can also distinguish signal components that have equal delays but distinct angles of arrival, provided the database is supplemented with appropriate additional channel information, e.g., a matrix representing a subspace spanned by the array response vectors of each signal component. Such subspaces can be identified using techniques like MUSIC, MODE, ESPIRIT, or WSF.

In power-controlled CDMA networks better receiver performance implies more users can be accommodated by using lesser transmit power per user in order to meet the target bit error rate. The location-aided receiver schemes described above increase the receiver performance, and hence increase user capacity in CDMA systems.

Although the above techniques have been described as being implemented at the base station receiver for uplink reception, in principle they may be implemented at the mobile receiver as well for downlink reception. In this case, the PDAP information could be transmitted to the mobile over a wireless link. In addition, some PDAP information may be stored at the mobile. For example, the channel parameters associated with a user's home and work could be stored in the mobile handset. When the handset determines from its own internal GPS receiver that it is located at the home or work location, the appropriate channel parameters can be used to improve receiver performance. It should be noted that uplink and downlink may use different frequency channels. Thus, in general their channel parameters would be different. However, typically the frequency difference is small, so these differences in channel parameters are small enough that one database can be used for both uplink and downlink.

Location assist can also be used to enhance transmission, such as for spatial beamforming at the transmitter and for pre-RAKE. It can also be used for MISO and MIMO transmit schemes. For example, angle of arrival parameters (or, more generally, antenna response vector information) can be used to perform spatial beamforming from an antenna array at the transmitter, spatially shaping the signal to direct spatial beams to spatially converge at the receiver location. Alternatively, or in addition, delay information can be used to temporally shape the signal to direct delayed components to converge temporally at the receiver. In both cases the technique helps to increase signal strength at the receiver, thereby increasing communication performance.

Although it is preferable to use this technique when one entity is mobile and the other fixed, it is possible to use this when both entities are mobile, as long as the database consists of PDAP values indexed on the location of both devices.

The techniques of the present invention are not limited any particular modulation scheme. In addition to CDMA, CDMA2000, WCDMA, they also apply to DS-SS, time division multiple access (TDMA) and orthogonal frequency division multiplexing (OFDM), such as used in IEEE802.16. They can also be used for single carrier modulation schemes (such as used in GSM) and techniques based on space-time processing and antenna arrays. In a RAKE or ST-RAKE receiver, the PDAP channel information can be used directly to parameterize the receiver rule. For other receivers, such as single carrier and OFDM, the PDAP channel information can be used to constrain the channel estimation problem of the receiver. Alternatively, different types of channel information can be stored that can be more directly used by these receivers.

The invention claimed is:

1. A method for location-assisted wireless communications, the method comprising:
   a) performing a calibration procedure comprising:
      i) determining a location of a first mobile transceiver in a service area of a base station located at a base station location;
      ii) measuring channel characteristics of a wireless channel between the base station and the first mobile transceiver, wherein the wireless channel comprises multiple spatial signal paths between the base station location and the location of the first mobile transceiver, and wherein the measured channel characteristics comprise multiple angle of arrival parameters representing measured angles of arrival of signals propagating through the multiple spatial signal paths, and multiple time delay parameters representing measured time delays of the signals propagating through the multiple spatial signal paths; and
      iii) storing in a database channel information comprising the measured channel characteristics indexed by the location of the first mobile transceiver; and
   b) performing real-time wireless communications comprising:
      v) obtaining a current location of a second mobile transceiver;
      vi) retrieving from the database stored channel characteristics corresponding to the current location of the second mobile transceiver, wherein the stored channel characteristics comprise L stored angle of arrival parameters $\theta_1, \ldots, \theta_L$ corresponding to L multiple spatial signal paths between the base station location and the current location of the second mobile transceiver, and L stored time delay parameters $\tau_1, \ldots, \tau_L$ corresponding to the L multiple spatial signal paths between the base station location and the current location of the second mobile transceiver;
      vii) receiving at the base station signals transmitted over a wireless channel from the second mobile transceiver at the current location, wherein the received signals propagate over the L multiple spatial signal paths between the base station location and the current location of the second mobile transceiver; and
      viii) performing space-time structured reception to improve reception of the received signals, wherein the space-time structured reception comprises processing the received signals using the L stored angle of arrival parameters $\theta_1, \ldots, \theta_L$ corresponding to the L multiple spatial signal paths between the base station location and the current location of the second mobile transceiver, and the L stored time delay parameters $\tau_1, \ldots, \tau_L$ corresponding to the L multiple spatial signal paths between the base station location and the current location of the second mobile transceiver.

2. The method of claim 1 wherein performing the calibration procedure further comprises:
   iv) processing the stored channel information by time-averaging channel information indexed by a common location and space-averaging channel information indexed by neighboring locations in a contiguous region.

3. The method of claim 1 wherein the measured channel characteristics further comprise multiple average signal power parameters representing measured average signal powers of the signals propagating through the multiple spatial signal paths between the base station location and the location of the first mobile transceiver; wherein the stored channel characteristics further comprise L stored average power parameters $\gamma_1, \ldots, \gamma_L$ corresponding to the L multiple spatial signal paths between the base station location and the current location of the second mobile transceiver; and wherein the space-time structured reception further comprises processing the received signals using the L stored average power parameters $\gamma_1, \ldots, \gamma_L$ corresponding to the L multiple spatial signal paths between the base station location and the current location of the second mobile transceiver.

4. The method of claim 3 wherein the measured channel characteristics comprise multiple measured power-delay-angle profiles corresponding to the multiple spatial signal paths between the base station location and the location of the first mobile transceiver; and wherein the stored channel characteristics comprise L multiple stored power-delay-angle profiles corresponding to the L multiple spatial signal paths between the base station location and the current location of the second mobile transceiver.

5. The method of claim 4 wherein the multiple measured power-delay-angle profiles comprise multiple power-delay-angle parameter triplets; and wherein the L multiple stored power-delay-angle profiles comprise L multiple stored power-delay-angle parameter triplets $(\gamma_1, \tau_1, \theta_1), \ldots, (\gamma_L, \tau_L, \theta_L)$.

6. The method of claim 5 wherein the space-time structured reception comprises processing the received signals using the L multiple stored power-delay-angle parameter triplets $(\gamma_1, \tau_1, \theta_1), \ldots, (\gamma_L, \tau_L, \theta_L)$ to improve channel estimation in a RAKE receiver located at the base station.

7. The method of claim 6 wherein processing the received signals using the L multiple stored power-delay-angle triplets comprises assigning strongest paths to fingers of the RAKE receiver using the L multiple stored power-delay-angle triplets.

8. The method of claim 6 wherein processing the received signals using the L multiple stored power-delay-angle triplets comprises assisting angle tracking in the RAKE receiver using the L multiple stored power-delay-angle triplets, wherein the RAKE receiver is a space-time RAKE receiver.

* * * * *